United States Patent [19]

Cristiani

[11] Patent Number: 4,988,073

[45] Date of Patent: Jan. 29, 1991

[54] EXCITATION COIL FOR A FUEL INJECTION METERING AND ATOMIZING VALVE ON AN INTERNAL COMBUSTION ENGINE

[75] Inventor: Marcello Cristiani, Imola, Italy

[73] Assignee: Weber S.r.l., Italy

[21] Appl. No.: 449,464

[22] Filed: Dec. 12, 1989

Related U.S. Application Data

[63] Continuation of Ser. No. 275,206, Nov. 23, 1988, abandoned.

[30] Foreign Application Priority Data

Nov. 24, 1987 [IT] Italy .............................. 53825/87[U]

[51] Int. Cl.[5] .......................... F16K 31/06; H01F 5/04

[52] U.S. Cl. .......................... 251/129.01; 251/129.15; 239/585; 335/260

[58] Field of Search ...................... 251/129.15, 129.01; 335/299, 260, 251, 278; 239/585

[56] References Cited

U.S. PATENT DOCUMENTS 4,393,994 7/1983 Rieck ......................... 251/129.15 X
4,538,645 9/1985 Perach ....................... 251/129.15 X
4,736,178 4/1988 Tanaka .
4,834,295 5/1989 Cristiani et al. ........... 251/129.15 X

FOREIGN PATENT DOCUMENTS 2710458 9/1977 Fed. Rep. of Germany ........................ 251/129.15
522109 6/1940 United Kingdom .
967764 8/1964 United Kingdom .
2061014 5/1981 United Kingdom .

*Primary Examiner*—Arnold Rosenthal
*Attorney, Agent, or Firm*—Kane, Dalsimer, Sullivan, Kurucz, Levy, Eisele and Richard

[57] ABSTRACT

A coil substantially comprising an annular winding of electric wire for producing a magnetic field in a coil integral with the valve body, and an anchor integral with a plunger; the ends of the winding wire being connected electrically to a pair of pins secured to a casing housing the winding itself; characterized by the fact that each pin presents an axial hole through which is threaded a portion of the winding wire, the end of which portion projects from one end of the pin and is connected to the same by a weld.

4 Claims, 2 Drawing Sheets

EXCITATION COIL FOR A FUEL INJECTION METERING AND ATOMIZING VALVE ON AN INTERNAL COMBUSTION ENGINE

This is a continuation of co-pending application Ser. No. 275,206 filed on Nov. 23, 1988, now abandoned.

BACKGROUND OF THE INVENTION

The present invention relates to an excitation coil for a fuel injector electromagnetic metering and atomizing valve on an internal combustion engine.

Known valves of the aforementioned type usually comprise a casing; a plunger moving axially inside the casing between a first position, wherein it opens a fuel injection hole formed in the front end of the casing, and a second position wherein said injection hole is closed; a core of magnetic material housed inside the casing; an anchor integral with the plunger; and an annular excitation coil designed to produce a magnetic field in the core for attracting the anchor and so moving the plunger into said first position.

Said coil substantially comprises an annular winding of electric wire, the ends of which are secured to respective pins connected electrically via various types of electrical connecting members. According to the embodiment described in patent application Ser. No. 67495-A/87 filed by the present Applicant and entitled "Fuel injector metering and atomizing valve on an internal combustion engine", the top end of each pin is connected electrically to a conducting bar substantially perpendicular to the pin. Said valve also comprises a plastic cap on the top, into which the ends of the pins and conducting bars are embedded.

On coils of the aforementioned type, the ends of the winding wire are connected to the respective pins by winding and welding the end portions of the wire on to the bottom ends of the pins. The resulting winding and pin assembly is then placed inside a mold into which thermoplastic material is injected for forming a casing about the winding and at the same time locking the bottom ends of the pins in relation to the casing.

Excitation coils of the aforementioned type present numerous drawbacks.

Firstly, electrical connection between the ends of the winding wire and respective pins is often unreliable, owing to poor contact and welding between the wire and the surface of the pin. Moreover, the connecting portion so formed between the wire and the ends of the pins is subjected to severe pressure, and may easily be damaged, when the coil casing material is injected about the winding and pins inside the mold.

Coils of the aforementioned type also involve a highly intricate, and therefore high-cost, manufacturing process, owing to the limited amount of access for welding between the winding and wire-pin welding area, and the care required for preventing damage to the winding by overheating.

SUMMARY OF THE INVENTION

The aim of the present invention is to provide an excitation coil for a fuel metering and atomizing valve of the aforementioned type, but involving none of the aforementioned drawbacks, i.e. a coil providing for reliable connection of the winding wire to the pins, and of fast, straightforward, low-cost manufacture.

With this aim in view, according to the present invention, there is provided an excitation coil for an electromagnetic fuel metering and atomizing valve on an internal combustion engine; said coil substantially comprising an annular winding of electric wire for producing a magnetic field in a core integral with the valve body; and an anchor integral with a plunger; the ends of said winding wire being connected electrically to a pair of pins secured to a casing housing said winding; characterised by the fact that each said pin presents an axial hole through which is threaded a respective end portion of said wire; the end of said portion projecting from one end of said pin and being connected to the same by a weld.

BRIEF DESCRIPTION OF THE DRAWINGS

The invention will be described by way of example with reference to the accompanying drawings, in which.

DETAILED DESCRIPTION OF THE INVENTION

Figure 1:
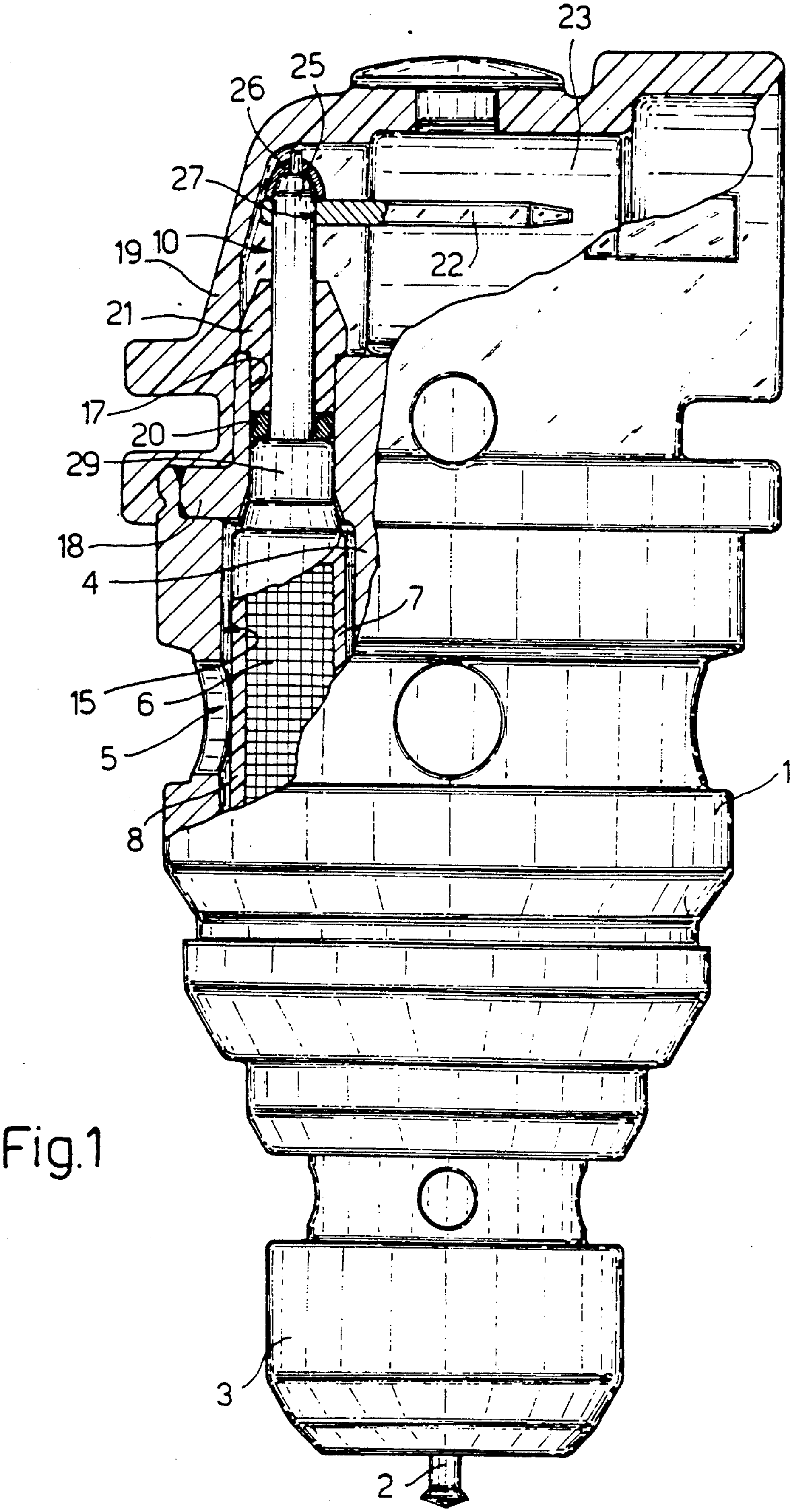
FIG. 1 shows a partially sectioned side view of an electromagnetic fuel metering and atomizing valve for an internal combustion engine, featuring the excitation coil according to the present invention.

The valve according to the present invention comprises a casing 1, and a plunger 2 moving axially inside said casing 1 between a first position, wherein it opens a fuel injection hole formed in a nozzle 3, and a second position wherein said injection hole is closed. Said valve also comprises a core 4 inside casing 1; a tubular anchor (not shown) integral with plunger 2; and an annular excitation coil 5 designed to produce a magnetic field in core 4 and the parts adjacent to the same, and so attract said anchor for moving plunger 2 into said first open position.

Figure 2:
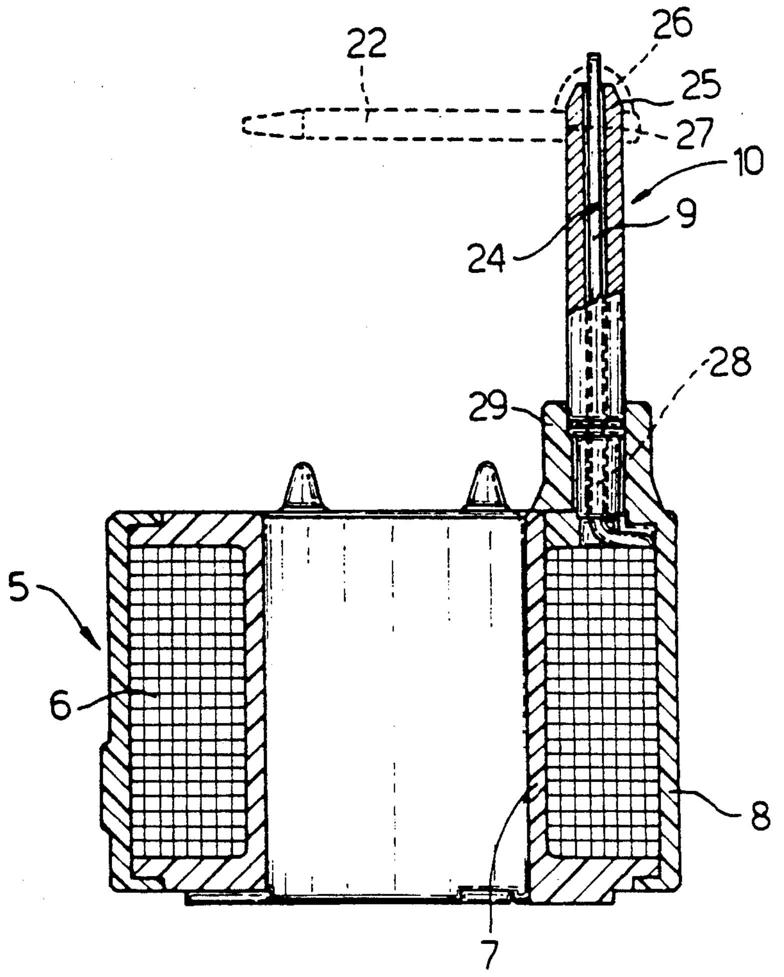
FIG. 2 shows a cross section of the excitation coil according to the present invention.

Coil 5 in FIG. 2 substantially comprises a winding 6 of electric wire wound on a spool 7 and enclosed in a casing 8 formed from thermoplastic material.

Each end 9 of winding 6 (FIG. 2) is connected electrically to a respective pin 10.

As shown clearly in FIG. 1, coil 5 is arranged inside a cavity 15 of valve casing 1 and about core 4, and each pin 10 is housed partially inside hole 17 on valve body 18, and partially inside cap 19 closing off the top of the valve. A sealing ring 20 and bush 21 are provided between each pin 10 and hole 17.

The top end of each pin 10 is preferably secured to a respective bar 22 substantially perpendicular to pin 10, partially embedded inside cap 19, and projecting inside a cavity 23 formed inside the same. The end of bar 22 is designed for connection to an appropriate electrical connecting element.

According to the present invention, each pin 10 presents an axial hole 24 (FIG. 2) through which is threaded a respective end portion 9 of winding wire 6. The end of said portion 9 projects from, and is welded to, the top end 25 of pin 10, conveniently by means of a weld spot 26 substantially extending over the end of pin 10. Each bar 22 presents a hole 27 inside which the end of respective pin 10 is fitted, and weld spot 26 also connects the end of bar 22 to end 25 of pin 10.

The bottom end 28 of each pin 10 is connected to a sleeve 29 on coil casing 8, which sleeve 29 is formed directly on to ends 28 of pins 10 from the same plastic material injected for forming casing 8.

The coil as described above is constructed as follows. Having formed winding 6 on spool 7, ends 9 of the winding are fitted through hole 24 of respective pins 10, with an end portion projecting from the same as shown in FIG. 2, after which, weld spot 26 may be applied. The assembly so formed is then placed inside a mold, in which material is injected for producing casing 8 and, at the same time, sleeves 29 for mechanically locking the bottom ends 28 of pins 10.

If the coil is provided with bars 22, these, too, are welded by spot 26 when welding end 9 of winding 6 to the top end 25 of pin 10. For so doing, each bar 22 is held in position in relation to pin 10 by means of an appropriate fixture (not shown).

The advantages of the coil according to the present invention will be clear from the foregoing description. Firstly, it provides for a high degree of efficiency by ensuring reliable electrical connection of the ends of winding 6 to respective pins 10. This is mainly due to the location of weld spot 26 between wire ends 9 and respective pins 10, and the extensive contact area between weld spot 26 and the surface of end 25 of pin 10. Successful welding is also assured by providing greater access to the weld area.

Secondly, the coil according to the present invention is cheap and easy to produce, by virtue of ends 9 being connected to pins 10 at such a distance from winding 6 as to in no way damage the same or limit access for welding, as on known types of coils.

Finally, sleeves 29 formed simultaneously with casing 8 provide for safe, reliable mechanical connection of the pins and coil.

To those skilled in the art it will be clear that changes may be made to the coil as described and illustrated herein without, however, departing from the scope of the present invention.

What is claimed is:

1. An excitation coil for electromagnetic fuel metering and atomizing valve on an internal combustion engine, said coil substantially comprising: an annular winding (6) of electric wire for producing a magnetic field in a core (4) integral with said valve body (1); an anchor integral with a plunger (2), the ends (9) of said winding wire being connected electrically to a pair of pins (10) secured to a casing (8) housing said winding wherein, each said pin has an end (25) projecting outside said casing and each presents an axial hole (24) through which is threaded a respective end portion of said wire, the end of said portion projecting from said end (25) of said pin and being connected to said end (25) by a weld (26); and a cap mounted on said valve, forming a cavity (23), wherein the end (25) of each said pin is connected electrically to a conducting bar (22) projecting inside said cavity (23) and wherein one end of said bar presents a hole (27) in which is fitted said end (25) of a respective pin;

said weld spot (26) connecting said end of said bar (22) to the end of the respective pin.

2. An excitation coil as claimed in claim 1, characterised by the fact that said weld consists of a weld spot (26) substantially covering said end (25) of the pin.

3. An excitation coil as claimed in claim 1, wherein said valve comprises a plastic cap (19) on top of said valve, characterised by the fact that said pins and said welds are disposed inside said cap.

4. An excitation coil as claimed in claim 1, characterised by the fact that the other end (28) of each said pin is connected to a sleeve (29) on said coil casing; said casing being formed from thermoplastic material injected directly on to said ends (28) in such a manner as to form said sleeves (29).

* * * * *